(12) United States Patent
Pan et al.

(10) Patent No.: US 7,221,428 B2
(45) Date of Patent: May 22, 2007

(54) CURING METHOD AND APPARATUS

(75) Inventors: Cheng Che Pan, Tainan County (TW); Sung Soo Park, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 150 days.

(21) Appl. No.: 10/743,456

(22) Filed: Dec. 23, 2003

(65) Prior Publication Data

US 2004/0135958 A1 Jul. 15, 2004

(30) Foreign Application Priority Data

Dec. 27, 2002 (TW) ............................ 91138214 A (51) Int. Cl.
*G02F 1/1335* (2006.01)
*G02F 1/1339* (2006.01)

(52) U.S. Cl. ..................... 349/190; 349/110; 349/111; 349/153

(58) Field of Classification Search ............... 349/110, 349/111, 153, 190, 187; 430/20, 321; 156/272.2, 156/275.5
See application file for complete search history.

(56) References Cited

U.S. PATENT DOCUMENTS

| 5,263,888 A | 11/1993 | Ishihara et al. |
| 2002/0196393 A1* | 12/2002 | Tashiro et al. ............. 349/106 |
| 2004/0135941 A1* | 7/2004 | Nam et al. .................. 349/110 |

* cited by examiner

*Primary Examiner*—Toan Ton
*Assistant Examiner*—Tai Duong
(74) *Attorney, Agent, or Firm*—Finnegan, Henderson, Farabow, Garrett & Dunner (57) ABSTRACT

The present invention provides a method for curing a light curable sealant in an article. The article includes opposing first and second substrates. The light curable sealant is used to attach the first substrate to the second substrate. The method includes irradiating steps (a) and (b). In the step (a), the article is irradiated by a light entering the article from the first substrate to reach the light curable sealant. In the step (b), the article is irradiated by a light entering the article from the second substrate to reach the light curable sealant. The present invention further provides curing apparatuses for accomplishing the aforementioned method.

3 Claims, 7 Drawing Sheets

CURING METHOD AND APPARATUS

BACKGROUND OF THE INVENTION

1. Field of the Invention

The present invention relates to a method and an apparatus for curing a light curable sealant, and more particularly to a curing method and an apparatus used in a liquid crystal display manufacturing process.

2. Description of the Related Art

An liquid crystal display cell typically includes two oppositely positioned first and second substrates and a liquid crystal layer interposed therebetween. The two substrates are typically affixed to each other with a thermosetting epoxy. However, this method needs a relatively high curing temperature which the liquid crystal material cannot bear, and therefore the step of curing the thermosetting epoxy should be conducted prior to filling of the liquid crystal material.

U.S. Pat. No. 5,263,888 discloses a one drop fill (ODF) method including the steps of applying an adhesive onto the entire periphery of the first substrate, dropping the liquid crystal material to the first substrate, superposing the second substrate upon the first substrate and pressing the substrates until a gap between the substrates reaches a predetermined value (typically 3–10 micrometers), and curing the adhesive. In the step of pressing the substrates, the liquid crystal material spreads to fill the space between the substrates thereby forming the liquid crystal layer. This method significantly reduces the number of the manufacturing steps and increases the manufacturing efficiency. However, instead of using the thermosetting epoxy, the one drop fill method must use a UV curable sealant which cures at near room temperature.

For simplifying the manufacturing process and increasing the manufacturing efficiency, the UV curing step is conducted by irradiating the liquid crystal display cell with the UV radiation entering the liquid crystal display cell only from the first substrate or the second substrate. Therefore, the UV radiation can't reach and cure the sealant unless it penetrates the first substrate or the second substrate first. However, each pixel on the first substrate is typically surrounded by a black matrix, and the second substrate is typically provided with a metallization pattern. Therefore, there is a problem of accessing regions of sealant with the UV radiation when there are black matrix or metallization pattern through which the UV cannot penetrate thereby resulting in incomplete curing of the sealant. There is mounting evidence that uncured sealant will react with the liquid crystal thereby causing the latter to degrade in its performance as a liquid crystal material.

Furthermore, if the UV radiation enters the liquid crystal display cell only from the first substrate, the black matrix that blocks the sealant from light must be kept away from the sealant in order to ensure that the UV curable sealant can be cured completely. But this means the area outside the display region of liquid crystal panel will be increased or the area of the display region will be decreased if the area of the liquid crystal panel remains the same, either the former design or the latter design varies from the developing trend of the liquid crystal display device.

SUMMARY OF THE INVENTION

Therefore, it is an object of the invention to provide an improved method and apparatus for curing a light curable sealant designed for affixing two substrates that can significantly suppress occurrence of incomplete curing of the sealant due to shadowing by the black matrix or the metallization pattern. The curing method and apparatus are intended to be used with the "one drop fill" method since it is becoming the preferred manufacturing method of the liquid crystal display device.

The liquid crystal display cell generally includes opposing first substrate and second substrate and a light curable sealant (e.g., a UV curable sealant) for attaching the first substrate to the second substrate. A liquid crystal layer is sandwiched between the first and the second substrates. Generally, the first substrate is provided with a light-shielding matrix formed thereon and the second substrate is provided with a metallization pattern formed thereon.

To achieve the above listed and other objects, the present invention provides a curing method including the following steps: (a) irradiating the liquid crystal display cell with light entering the liquid crystal display cell from the first substrate to reach the light curable sealant thereby avoiding the metallization pattern on the second substrate from blocking the irradiating step (a); and (b) irradiating the liquid crystal display cell with light entering the liquid crystal display cell from the second substrate to reach the light curable sealant thereby avoiding the light-shielding matrix on the first substrate from blocking the irradiating step (b). To simplify the manufacturing process and increase the manufacturing efficiency, the steps of (a) and (b) are preferably conducted simultaneously. Since the curing method of the present invention is conducted by irradiating the liquid crystal display cell with light entering from the first substrate and the second substrate, occurrence of incomplete curing of the sealant due to shadowing by the black matrix or the metallization pattern is significantly suppressed.

The present invention further provides curing apparatuses for accomplishing the aforementioned method.

According to one embodiment of the present invention, the curing apparatus mainly includes first and second stages for holding a work piece (e.g., the aforementioned liquid crystal display cell), a light source and means for transporting the work piece from the first stage to the second stage.

According to another embodiment of the present invention, the curing apparatus mainly includes first and second stages, a light source, mechanism for holding and turning over the work piece and first and second transporting means. The first transporting means is configured for transporting the work piece from the first stage to the holding and turning over mechanism. The second means is configured for transporting the work piece from the holding and turning over mechanism to the second stage.

In the aforementioned embodiments, when the work piece is placed on the first stage, light generated by the light source enters the work piece from the first substrate to reach the light curable sealant; when the work piece is placed on the second stage, light generated by the light source enters the work piece from the second substrate to reach the light curable sealant thereby the light curable sealant can be cured by light entering the work piece from the first substrate and the second substrate. Moreover, the aforementioned transporting means preferably includes a robot utilizing a chuck assembly to hold the work piece.

According to still another embodiment of the present invention, the curing apparatus mainly includes means for supporting a work piece and a light source. The light source includes a first irradiation unit and a second irradiation unit arranged on an opposite side of the work piece from the first irradiation unit. When the work piece is supported by the supporting means, the light generated by the first irradiation unit enters the work piece from the first substrate to reach the light curable sealant, and the light generated by the second irradiation unit enters the work piece from the second substrate to reach the light curable sealant. In this embodiment, the work piece supporting means may be a stage including a transparent work area for holding the work piece such that the light curable sealant is substantially not shadowed by the work piece supporting means thereby the light curable sealant can be cured by light entering the work piece from the first substrate and the second substrate. Moreover, the work piece may include clamps for holding the edges of the first and second substrates, or include a plurality of pins for supporting the work piece.

According to still another embodiment of the present invention, there is provided a liquid crystal display cell comprising a first substrate with a light-shielding matrix formed thereon, a second substrate with a metallization pattern formed thereon, a liquid crystal layer sandwiched between the first and the second substrates, and a light curable sealant for attaching the first substrate to the second substrate, wherein the light curable sealant is cured by (a) irradiating the liquid crystal display cell with light entering the liquid crystal display cell from the first substrate to reach the light curable sealant; and (b) irradiating the liquid crystal display cell with light entering the liquid crystal display cell from the second substrate to reach the light curable sealant, whereby the light curable sealant is cured by the light entering the liquid crystal display cell from the first and second substrates.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

The present invention provides an improved method and apparatus for curing a light curable sealant designed for affixing two substrates together. The curing method and apparatus of the present invention are intended to be used with the "one drop fill" method since it is becoming the preferred manufacturing method of the liquid crystal display device.

Figure 1:
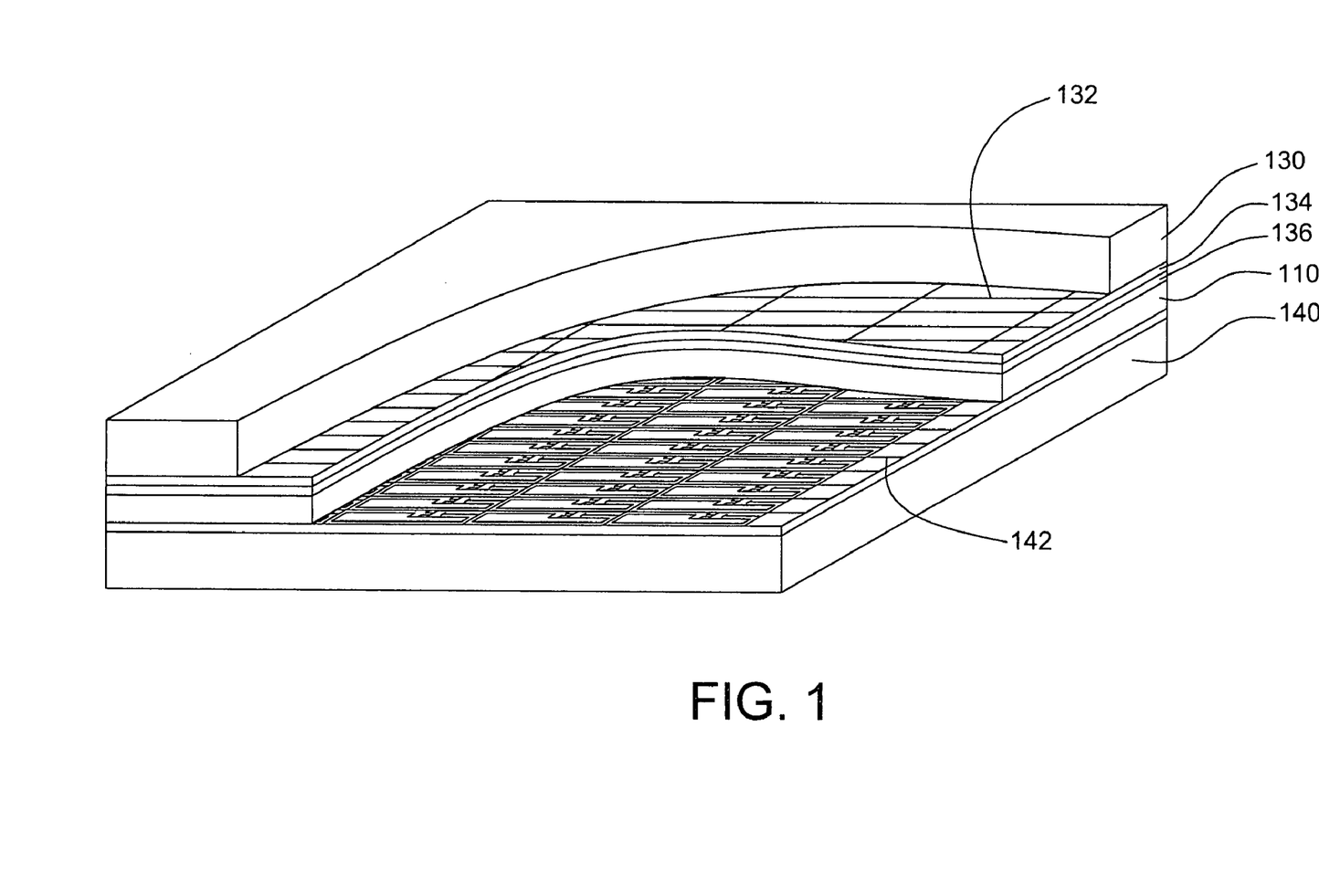
FIG. 1 is a cross-sectional view of a portion of a liquid crystal display device suitable for use in the present invention.

FIG. 1 shows a liquid crystal display device 110 mainly including a liquid crystal layer sealed in a liquid crystal display cell 120. The liquid crystal display cell 120 includes a first substrate 130 and a second substrate 140. The first substrate 130 is typically provided with a light-shielding matrix (e.g. black matrix 132), color filters 134 for display color and a transparent electrode (e.g. ITO electrode) serving as a common electrode 136. The second substrate 130 is mainly provided with a metallization pattern 142 (e.g. a plurality of gate lines and data lines) formed thereon. It is preferred that the liquid crystal display device used in the present invention is a thin film transistor liquid crystal display. Generally, the first substrate 130 is referred to as a color filter substrate because it is provided with color filters, and the second substrate 140 is referred to as a thin film transistor substrate.

Figure 2:
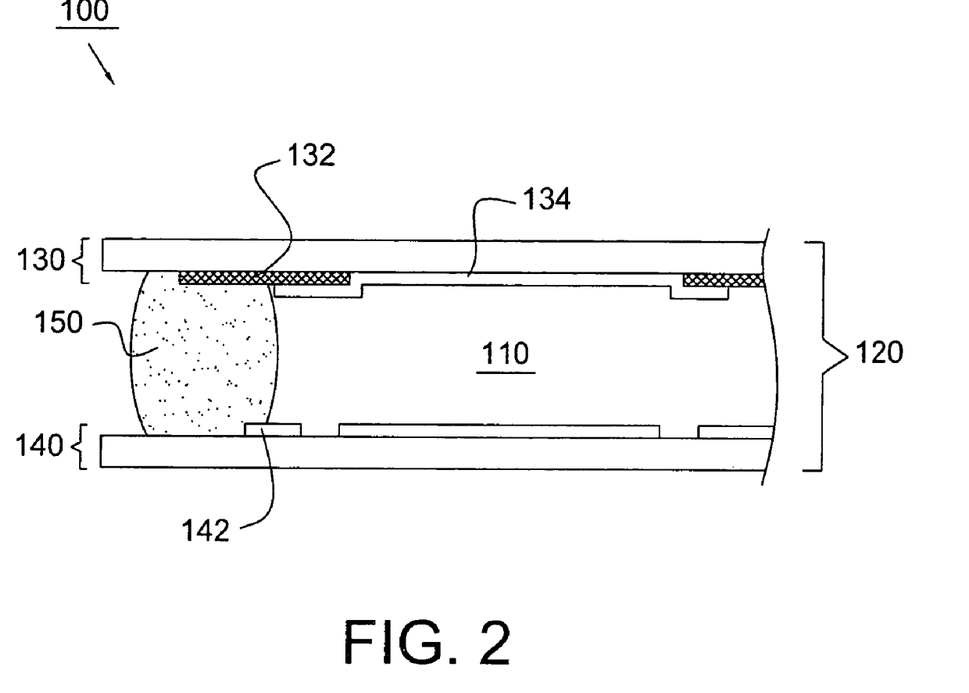
FIG. 2 is a cross-sectional view of a portion of a liquid crystal display cell suitable for use in the present invention.

As shown in FIG. 2, the first substrates 130 and the second substrate 140 are affixed to each other by a light curable sealant 150. The UV curable sealant 150 is typically positioned near a peripheral edge of two substrates 130 and 140 which are substantially transparent to light except the regions of black matrix 132 and metallization pattern 142 that prevent light from penetrating to reach the sealant 150.

Therefore, the present invention provides a curing method including two irradiating steps (a) and (b). In the irradiating step (a), the irradiating light enters the liquid crystal display cell 120 from the first substrate 130 to reach the light curable sealant 150 whereby the metallization pattern 142 on the second substrate 140 will not block the irradiating step (a). In the irradiating step (b), the irradiating light enters the liquid crystal display cell 120 from the second substrate 140 to reach the light curable sealant 150 whereby the black matrix 132 on the first substrate 130 will not block the irradiating step (b). To simplify the manufacturing process and increase the manufacturing efficiency, the steps of (a) and (b) are preferably conducted simultaneously. Additionally, the light curable sealant may be a UV curable sealant, and the light is irradiated from a UV irradiation unit.

Since the curing method of the present invention is conducted by irradiating the liquid crystal display cell with light entering from the first substrate 130 and the second substrate 140, occurrence of incomplete curing of sealant due to shadowing of the black matrix 132 and metallization pattern 142 is significantly suppressed.

FIGS. 3–7 illustrate the curing apparatuses according to preferred embodiments of the present invention and similar components have been given the same reference numerals.

Figure 3A:
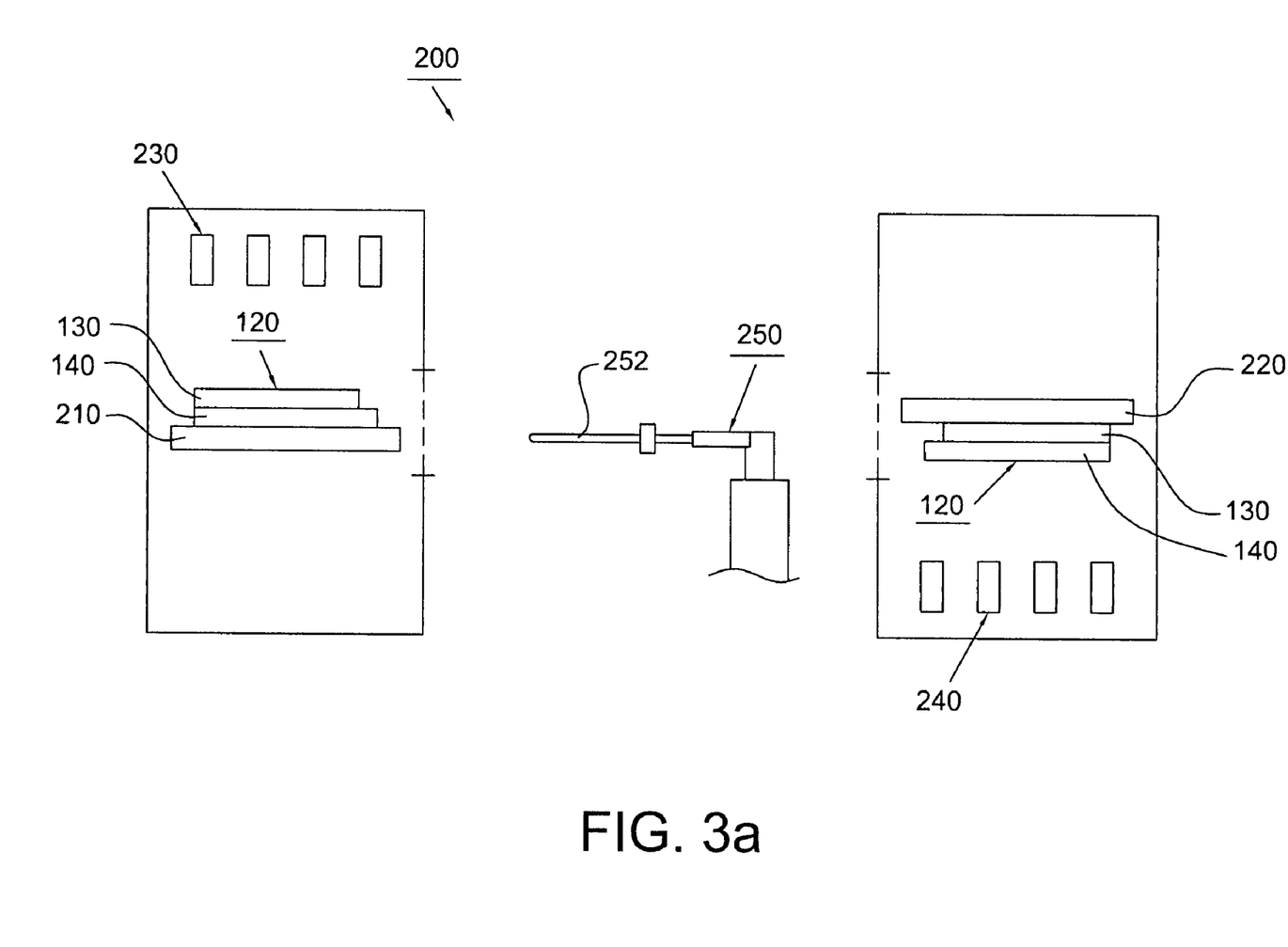
FIG. 3a is a cross-sectional view of a curing apparatus according to one embodiment of the present invention.

FIG. 3a illustrates a curing apparatus 200 according to one embodiment of the present invention. The curing apparatus mainly includes stages 210, 220, an irradiation unit 230 and transporting means. It is preferred that the stages 210, 220 can hold the work piece that is to be irradiated (e.g. the aforementioned liquid crystal display cell 120) and permits movement and alignment of the liquid crystal display cell 120 in X and Y directions (horizontally) and ration in X-Y plane. A vacuum device such as a vacuum pump may be connected to the stages 210, 220 thereby drawing a vacuum on the stages 210, 220 to secure the liquid crystal display cell 120 thereon. If the sealant that is to be cured is a UV curable sealant, the irradiating units 230, 240 may be respectively provided with a plurality of UV lights.

The transporting means of the present invention can engage the work piece to retain or alter position of the work piece. The embodiment shown in FIG. 3a includes a robot 250 with a chuck assembly 252. The chuck assembly 252 preferably includes means for engaging and retaining the work piece. The chuck assembly 252 may include a vacuum device such as a vacuum pump for drawing a vacuum on the chuck assembly 252 to secure the liquid crystal display cell 120 thereon. However, the present invention may include other devices such as clamps for holding the liquid crystal display cell 120.

The liquid crystal display cell 120 is placed on the stage 210 with the first substrate 130 thereof facing the irradiation unit 230. Therefore, the light from the irradiation unit 230 enters the liquid crystal display cell 120 from the first substrate 130 to reach the light curable sealant. In the curing apparatus 200 shown in FIG. 3a, the irradiation unit 240 is arranged on an opposite side of the stages 210, 220 from the irradiation unit 230. Therefore, the robot 250 must be designed to be able to suck the liquid crystal display cell 120 by the chuck assembly 252 thereof and then place the liquid crystal display cell 120 on the stage 220 with its second substrate 140 facing the irradiation unit 240. Next, the light from the irradiation unit 240 enters the liquid crystal display cell 120 from the second substrate 140 to reach the light curable sealant.

Figure 3B:
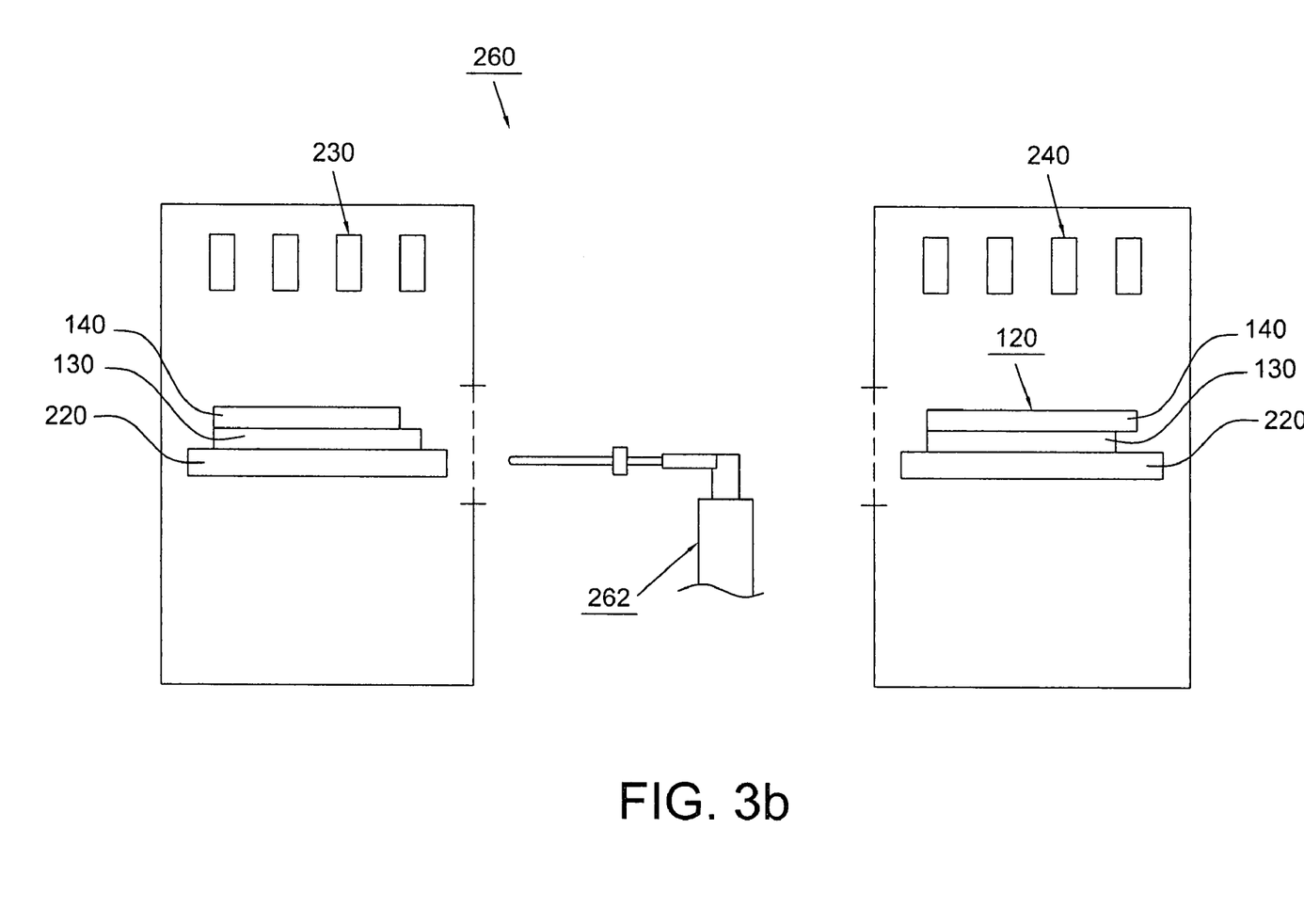
FIG. 3b is a cross-sectional view of a curing apparatus according to another embodiment of the present invention.

FIG. 3b illustrates a curing apparatus 260 according to another embodiment of the present invention. The curing apparatus 260 is characterized in that the irradiation unit 240 is arranged on the same side of the stages 210, 220 as the irradiation unit 230. Therefore, the robot 262 must be designed to be able to suck the liquid crystal display cell 120 by the chuck assembly 252 thereof and then place the liquid crystal display cell 120 on the stage 220 with its second substrate 140 facing the irradiation unit 240.

Figure 4:
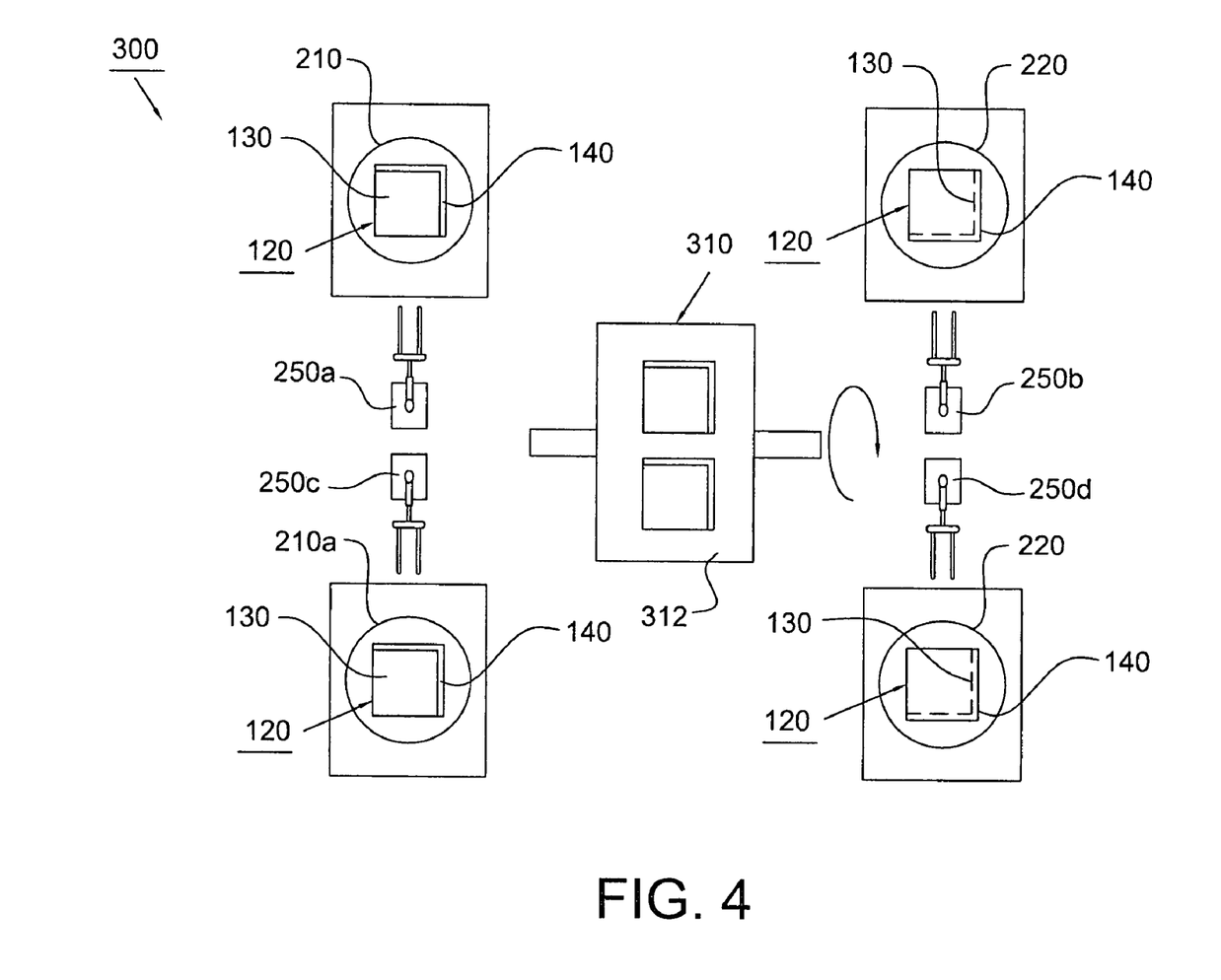
FIG. 4 is a top plan view of a curing apparatus according to another embodiment of the present invention.

FIG. 4 illustrates a curing apparatus 300 according to another embodiment of the present invention. The curing apparatus 300 mainly includes stages 210, 220, 210a, 220a, a plurality of irradiation units (not shown), mechanism 310 for holding and turning the work piece and transporting means such as robots 250a, 250b, 250c, 250d. The mechanism 310 is preferably provided with a stage 312 including a vacuum device such as a vacuum pump for drawing a vacuum on the stage 312 to secure the liquid crystal display cell 120 thereon.

Referring to FIG. 4, two liquid crystal display cells 120 are placed on the stages 210, 210a respectively. Since the irradiation units (not shown) are arranged above the supporting surface of the stages 210, 220, 210a, 220a, the light from the irradiation unit enters the liquid crystal display cell 120 from the first substrate 130 to reach the light curable sealant. Next, the two liquid crystal display cells 120 are respectively placed on the stage 312 of the mechanism 310 by the robots 250a, 250c. After a turning operation of the stage 312 is conducted, the two liquid crystal display cells 120 are respectively placed on the stages 220, 220a by the robots 250b, 250d. At this time, the first substrate 130 of the liquid crystal display device 120 faces the stages 220, 220a. Therefore, the light from the irradiation unit enters the liquid crystal display cell 120 from the second substrate 140 to reach the light curable sealant. It should be understood that the robots 250a, 250c or the robots 250b, 250d can be integrated into one device by being connected together.

Figure 5:
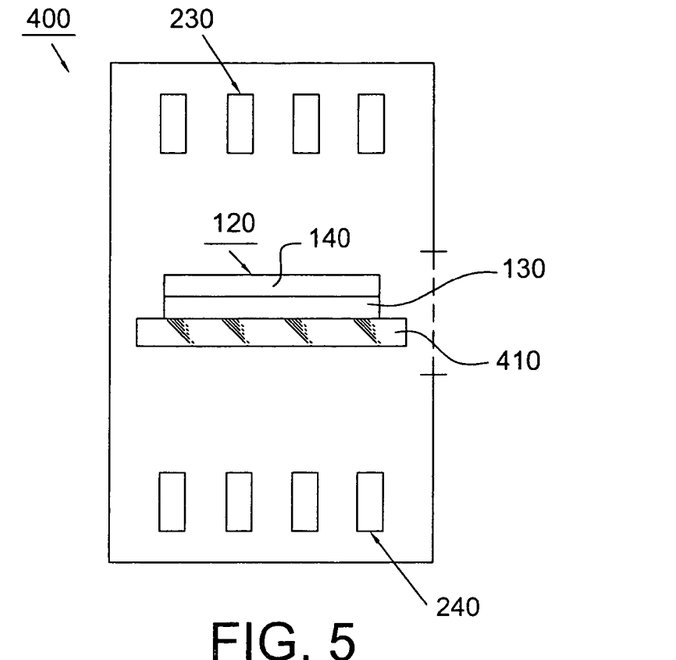
FIG. 5 is a cross-sectional view of a curing apparatus according to another embodiment of the present invention.

FIG. 5 illustrates a curing apparatus 400 according to another embodiment of the present invention. The curing apparatus 400 mainly includes means for supporting a liquid crystal display cell 120 and irradiation units 230, 240. The irradiation unit 230 is arranged on an opposite side of the liquid crystal display cell 120 from the irradiation unit 240. In the curing apparatus 400 shown in FIG. 5, the work piece supporting means may be a stage 410 having a transparent work area for holding the liquid crystal display cell 120 such that the light curable sealant is not shadowed by the stage 410. The stage 410 is preferably made of transparent quartz material. Therefore, the light generated by the irradiation unit 230 enters the liquid crystal display cell 120 from the first substrate 130 to reach the light curable sealant, and the light generated by the irradiation unit 240 enters the work piece from the second substrate 140 to reach the light curable sealant.

Figure 6:
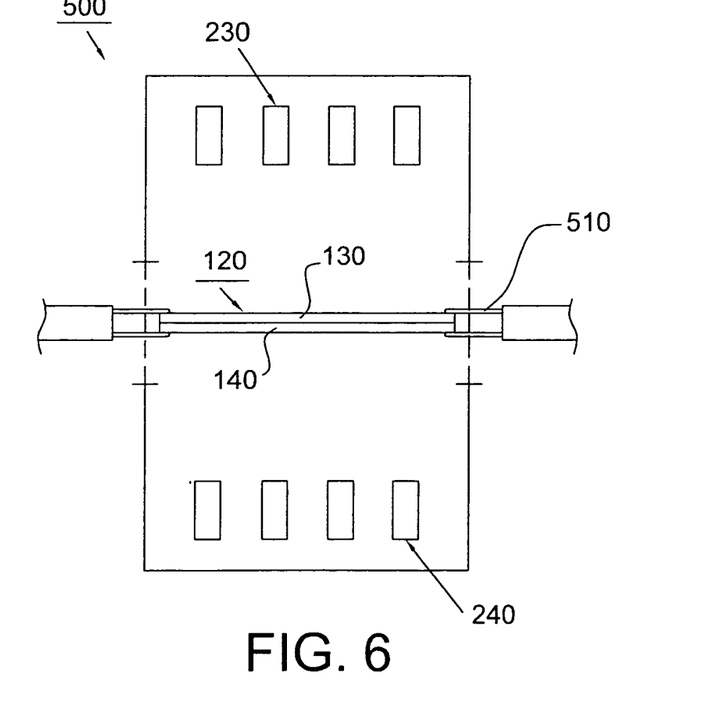
FIG. 6 is a cross-sectional view of a curing apparatus according to another embodiment of the present invention.

FIG. 6 illustrates a curing apparatus 500 according to another embodiment of the present invention. The curing apparatus 500 is substantially identical to the curing apparatus 400 shown in FIG. 5 with an exception that the work piece supporting means is a clamp 510. The clamp 510 is configured for holding the edges of the first substrate 130 and second substrate 140 of the liquid crystal display cell 120 such that light curable sealant won't be shadowed by the clamp 510.

Figure 7:
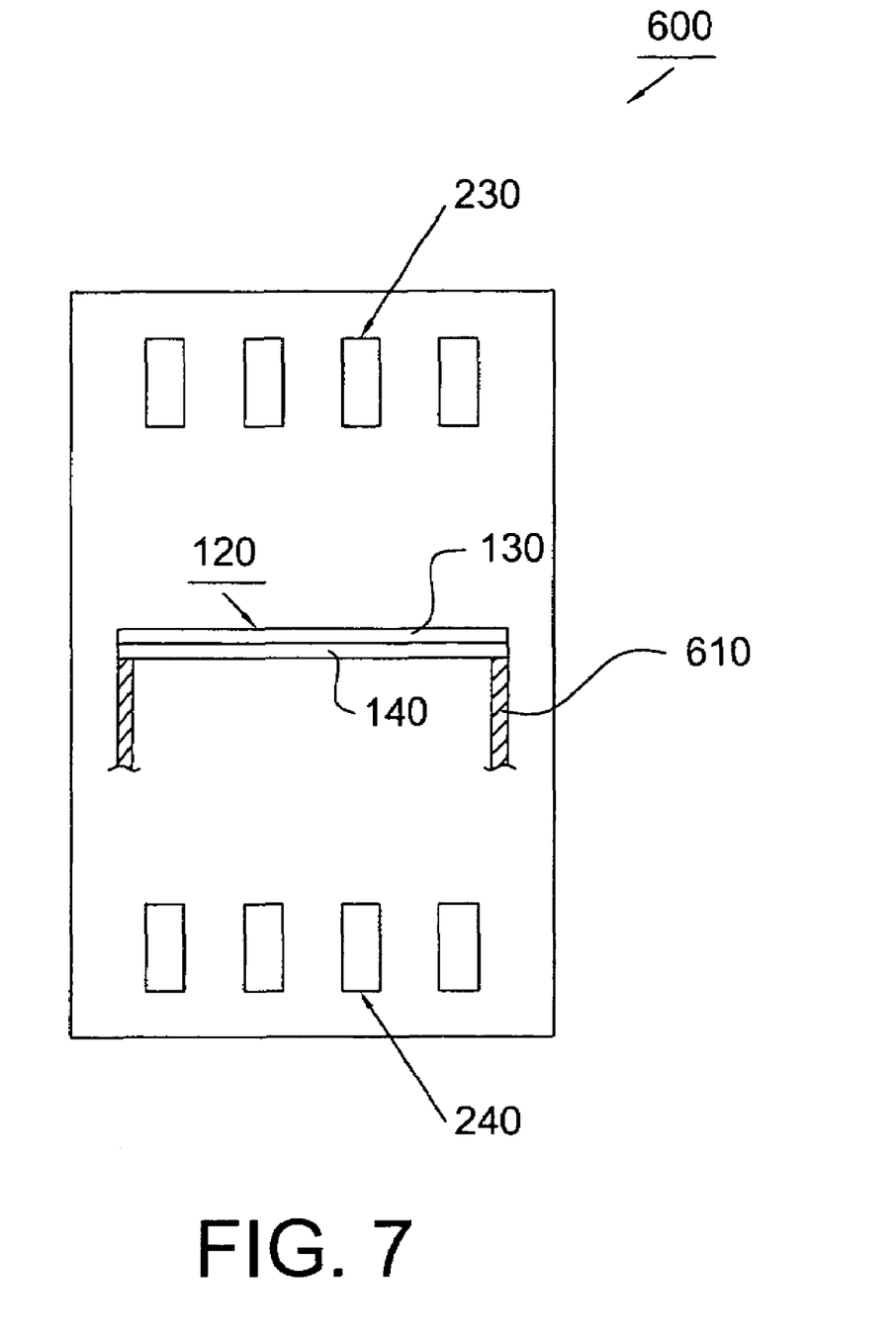
FIG. 7 is a cross-sectional view of a curing apparatus according to another embodiment of the present invention.

FIG. 7 illustrates a curing apparatus 600 according to another embodiment of the present invention. The curing apparatus 600 is substantially identical to the curing apparatus 400 shown in FIG. 5 with an exception that the work piece supporting means includes a plurality of pins 610 for supporting the work piece.

Although the invention has been explained in relation to its preferred embodiment, it is to be understood that many other possible modifications and variations can be made without departing from the spirit and scope of the invention as hereinafter claimed.

What is claimed is:

1. A curing method, comprising the steps of:
    providing an article including opposing first and second substrates and a light curable sealant for attaching the first substrate to the second substrate, wherein the first substrate is provided with a light-shielding matrix formed thereon and faces a predetermined direction, and the second substrate is provided with a metallization pattern formed thereon;
    irradiating the article with light entering the article from the first substrate to reach the light curable sealant;
    turning over the article to make the second substrate face the predetermined direction; and
    irradiating the article with light entering the article from the second substrate to reach the light curable sealant, whereby the light curable sealant is cured by the light entering the article from the first and second substrates.

2. The method as claimed in claim 1, wherein the light curable sealant is a UV curable sealant, and the light is generated from a UV irradiation unit.

3. The method as claimed in claim 1, wherein the article is a liquid crystal display cell.

* * * * *